United States Patent
Thompson et al.

(10) Patent No.: US 6,735,616 B1
(45) Date of Patent: May 11, 2004

(54) METHOD AND APPARATUS FOR REMOTE PROJECTOR ADMINISTRATION AND CONTROL

(75) Inventors: Kevin Thompson, Salem, OR (US); De Tran, Portland, OR (US); Derek Jensen, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 723 days.

(21) Appl. No.: 09/590,034

(22) Filed: Jun. 7, 2000

(51) Int. Cl.$^7$ ............................ G06F 15/16; G11B 31/00

(52) U.S. Cl. ...................... 709/204; 709/203; 709/217; 360/79; 360/80

(58) Field of Search ..................... 709/202, 203–204, 709/217, 315; 360/79–80

(56) References Cited

U.S. PATENT DOCUMENTS

| | | | |
|---|---|---|---|
| 5,859,623 A | | 1/1999 | Meyn et al. |
| 6,216,158 B1 | * | 4/2001 | Luo et al. .................... 709/217 |
| 6,437,786 B1 | * | 8/2002 | Yasukawa .................... 345/474 |
| 6,499,062 B1 | * | 12/2002 | Shteyn ........................ 709/315 |
| 6,516,337 B1 | * | 2/2003 | Tripp et al. .................. 709/202 |
| 6,560,637 B1 | * | 5/2003 | Dunlap et al. ............... 709/204 |

OTHER PUBLICATIONS

Arnold, "The Jini Architecture: Dynamic Services in a Flexible Network," Proceedings of the 36th ACM IEEE Design Automation Conference, Jun. 1999, pp. 157–162.*

* cited by examiner

Primary Examiner—Wen-Tai Lin

(57) ABSTRACT

A remote projector and administration control method and apparatus enables the integration of presentation projector resources in an networked enterprise environment. A projector server computer connected to the network hosts one or more presentation data/video projectors. Alternatively, a network enabled projector functions as both the projector server host and projector. Residing on the projector server host are a repository for storing presentation data and user profiles, a projector server and three interfaces: a projector interface to communicate with the hosted projector, a host discovery interface to discover other projector server hosts or network enabled projectors on the network, and a host interface to interact with the identified hosts using the facilities of the remote projector and administration method and apparatus. The host discovery interface discovers the identity of other active projector servers or network enabled projectors on the network. The host interface enables clients to get or set information controlling the identified active projector servers or network enabled projectors, including administering the security, operation, and maintenance of the projectors. The projector server serves web content obtained from the three interfaces to clients using a standard web server.

34 Claims, 14 Drawing Sheets

Administration

- ### System Setup
  View and edit system setup, security options, etc.

- ### Projector Setup
  View and edit projector settings and power usage options

- ### System Status
  View and status of connected PCs and projectors

- ### Edit Admin Password
  Change the administration password to this machine

- ### Logout As Administrator
  Unlock the administration area

Administration

System Setup

System Name: Kevin's LightPort

Contact: Kevin Thompson

Location:

Designate as Supernode: ☐  [Submit]

- Usage Notes
- Presentation Security
- Delete Presentaion

Administration

Usage Notes ─────────

In Kevin's office.  Call me if you want to use it

Submit

Administration

Delete Presentation

| | Name | Owner | Received |
|---|---|---|---|
| ☻ | Network Connectivity.ppt | kevin thompson | Mon Jun 05 2000 15:03 |

[ Delete ]  [ Clear ]

Administration

Projector Setup ——————————

- Settings
  View and edit projector settings

- Power Management
  View and edit projector power options

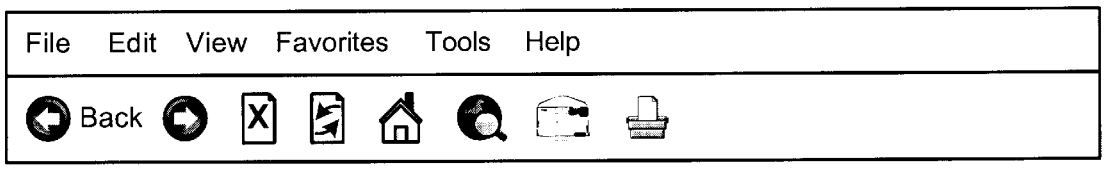

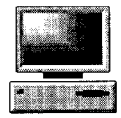 Administration

System Status ─────────────────────

There have been 0 files transferred since the last reset.

The average file size has been 0 bytes since the last reset.

There have been 0 files transferred of unknown type since the last reset.

Unknown file types since last reset:.

There have been 1 files played since the last reset.

There have been 0 presentations not transferred due to low disk space.

The projector has been on for 0 hours 10 minutes.

The projector has been turned on 378 times.

The projector has been on for 30 minutes or longer 79 times.

The projector has been on for 60 minutes or longer 54 times.

The projector has been on for 90 minuets or longer 41 times.

The last three bulbs have been used 770233, 0, and 0 hours each.

FIG. 5i

Administration

Edit Administration Password

Enter New Password: ☐

Confirm Password: ☐

[ Submit ]

METHOD AND APPARATUS FOR REMOTE PROJECTOR ADMINISTRATION AND CONTROL

BACKGROUND OF THE INVENTION

1. Field of the Invention

The present invention relates generally to presentation projectors for projecting computer generated presentations and other images to a viewing surface. In particular, the present invention relates to technology that enables the remote administration and control of presentation projector resources in a networked enterprise.

2. Background Information

The widespread acceptance of using computers to facilitate group communications has created a large demand for devices that project computer displays. As a result, corporate enterprises have installed sophisticated projector equipment in many workplace conference rooms, or provide access to portable presentation equipment that can be used in conference rooms as needed. To display their presentations, users tote portable computers such as laptops into the conference room, and connect to the projector using a serial cable or other communication link.

Another trend in the use of computers to facilitate group communications is the extension of the corporate network into the conference room, thereby providing access to the resources of the entire corporate enterprise. In a natural next step, many conference rooms are now equipped with a permanently installed conference room computer that functions as a "projector server." Connected to both the network and the projector, the projector servers have easy access to other computers, online storage, printers, intranets, and the Internet. With virtually all internal corporate resources and the external resources of the Internet available from all corporate conference rooms, the full benefits of computer-based presentation start to emerge.

Despite these advances in conference room technology, the logistics of properly setting up the projector server and projection equipment can still be a difficult task. Users may be unfamiliar with the proper procedure to set up the projector or the projector server, or with the proper use of the remote control device used to operate the projector. Unexpected problems may arise, such as bulb or other equipment failure. There may also be security concerns with transferring presentation files to the conference room projector server, or scheduling concerns with providing controlled access to presentation projector resources. What is still missing is true integration. Just as an effective system is not merely a collection of components that must be "integrated" by a user before every use, an effective conference room presentation system is not merely a collection of projection equipment, cables, and networked computers. True integration of the presentation projector in the modern corporate enterprise is a presentation system that solves the larger problem of managing and controlling computer-based presentation projector resources.

There are a number of devices that attempt to facilitate the management and use of computer-based presentation projector resources that are known in the art. For example, there are software applications developed for the projector server that provide a user-friendly graphical user interface to the hardware features of the presentation projection equipment. Such applications can automatically synchronize the resolution of the projector server to the presentation projector and adjust other hardware settings such as color, brightness, etc. One of the many limitations of these prior art applications is that they are principally standalone applications dedicated to the control of only the currently connected presentation projector equipment. Prior art projector server applications do not take advantage of recent advances in networking technologies, including web-based technology for distributing applications over a corporate intranet. While the prior art projector server applications may succeed in making the projector easier to use, they simply do not address the larger problem of managing and controlling the use of computer-based presentation projector resources in a networked enterprise.

Accordingly, a new approach to providing remote projection administration and control that facilitates the maintenance, operation and security of enterprise presentation projector equipment is desirable. What is needed is a way to truly integrate presentation projector resources into the corporate enterprise network, as have printers and other types of peripheral equipment. Administrators will save significant time and energy not only by keeping the equipment properly maintained and secured, but also by helping to solve routine setup problems encountered by users, and by allowing the debugging of such problems from a remote location. Users will be able to more easily prepare for presentations by not only remotely sending the necessary presentation files to the appropriate conference room, but also by automatically configuring the projector with the proper settings for their presentation in advance of the scheduled presentation. The integration of presentation projector resources in the corporate enterprise network in an effective and user-friendly way presents a unique set of challenges, requiring a new and novel solution.

SUMMARY

According to one aspect of the invention, a method is provided in which a client remotely locates and controls the operation and administration of a presentation projector resource in an enterprise network. A projector server facilitates the remote location and control of the presentation projector by the client using data obtained from interfaces to the projector equipment and the other projector servers on the network, as well as data stored on a repository accessible to the projector server. The projector server serves the data to the clients using the facilities of a graphical user interface such as a browser-based Hypertext Transport Protocol (HTTP)/web server.

BRIEF DESCRIPTION OF DRAWINGS

The present invention will be described by way of exemplary embodiments, but not limitations, illustrated in the accompanying drawings in which like references denote similar elements, and in which:

FIG. 5i illustrates an example of a display of a System Status web page, in accordance with one embodiment;

DETAILED DESCRIPTION OF THE INVENTION

In the following description various aspects of the present invention, a remote projector administration and control (RPAC) method and apparatus, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known features may be omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
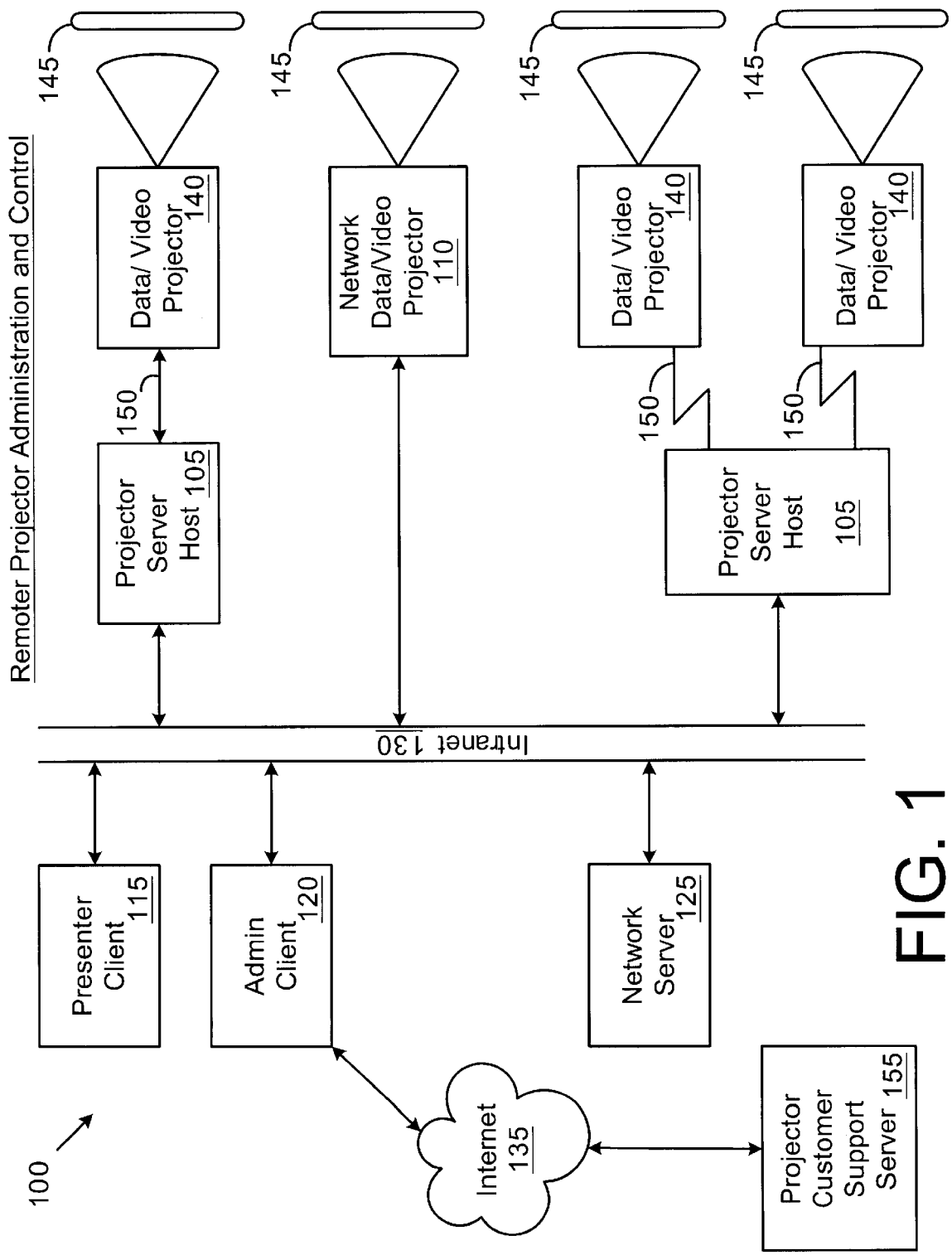
FIG. 1 illustrates an overview of the Remote Projector Administration and Control (RPAC) method and apparatus in an operating environment configured in accordance with one embodiment.

Referring now to FIG. 1, wherein an overview of the RPAC method and apparatus 100 in an operating environment configured in accordance with one embodiment is shown. As illustrated, a plurality of projector server hosts 105 and network enabled data/video projectors 110 in communication with a presenter client 115, an administrator client 120, or a network server 125, either via a secure intranet connection 130 or over the Internet 135, or a combination thereof, are used to control a selected data video projector 140 or a network enabled data video projector 110. The data video projectors 140 and network enabled data video projectors 110 may be liquid crystal display (LCD), digital mirror device (DMD), liquid crystal on silicon (LCOS) projectors or the like that include a light source and transmissive or reflective projection optics to form and project display images on a display surface 145 in both rear and front display applications. Examples of such presentation projectors are sold under the trademark LIGHT-PORT by In Focus Systems, Inc., of Wilsonville, Oreg., the assignee of the present application.

The projectors are typically located in a conference room in a networked corporate enterprise and connected to the projector server host 105 via a communications link 150, which may be either a serial cable, universal serial bus (USB), infrared, or other wireless/wired connection. The network enabled projectors 110 may be connected directly to the corporate intranet 130, and typically operate using a real-time operating system (RTOS) such as Wind River or Microsoft's Windows CE. The projector server hosts 105 are either desktop personal computers, laptop computers, personal digital assistants (PDAs), or other type of computer appliance capable of running an operating system with a graphical user interface such as Microsoft's Windows 98, Windows 2000, and Windows CE platforms. The network server 125 is typically a server computer capable of running an operating system platform with a graphical user interface such as Microsoft's Windows 98, Windows 2000, or server operating system platform such as Windows NT. A network server 125 can function both as a projector server host to one or more data video projectors 140 and network enabled data/video projectors 110 in addition to functioning as a network server.

In one embodiment, a client such as the administrator client 120 may be further connected to the Internet 135 to connect to a projector customer support server 155 operated by a third party, such as the manufacturer of the projectors 110 and 140. The Internet connection can facilitate troubleshooting of projector problems by enabling the administrator to access web sites hosted by the customer support server 155 and uploading diagnostic projector health information obtained from the projector server host 105 that controls the failed data video projector 140, or directly from the network enabled data video projector 110. In addition, projector software and the software components of RPAC may be periodically updated automatically from the customer support server 155 or corporate network server 125.

In one embodiment, certain selected projector server hosts 105 or network servers 125 may be designated as super-node network servers to serve projector profiles to the enterprise as well as the status of the enterprise's projector fleet through automated host discovery. It should be understood that further variations of the configuration in the illustrated embodiment in FIG. 1 may be employed without departing from the principles of the invention.

Figure 2:
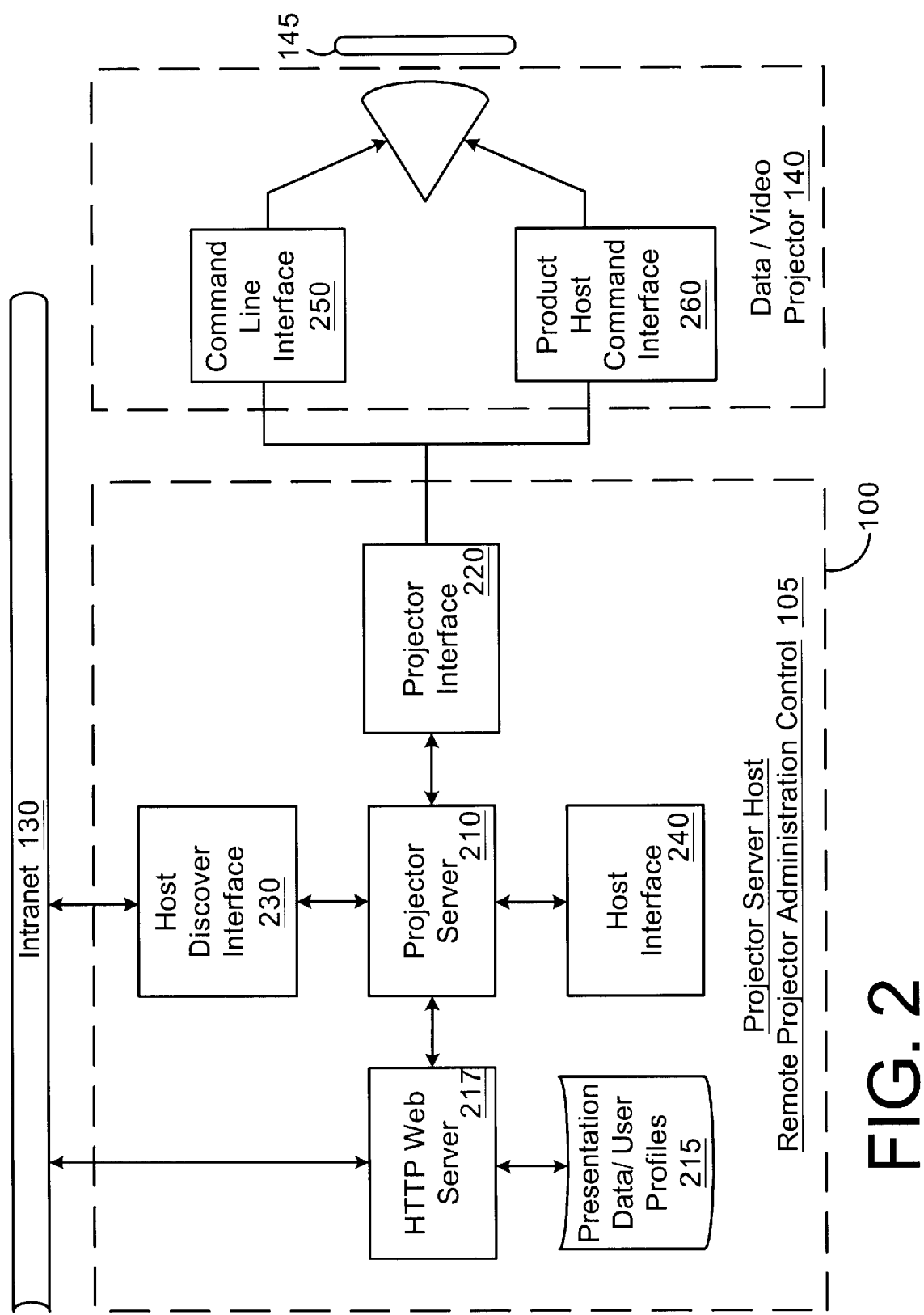
FIG. 2 illustrates a block diagram of the functional components of the present invention in accordance with one embodiment.

Referring now to FIG. 2, wherein a block diagram illustrating the functional components of the RPAC method and apparatus 100 are shown. The functional components include a projector server 210 residing on a projector server host 105 that is connected to a data video projector 140. The projector server 210 interacts with three interfaces: the projector interface 220, the host discover interface 230, and the host interface 240. Also residing on the projector server host 105 are a repository for storing presentation data and user profiles 215 and an HTTP/web server 217 for serving information to and from the three interfaces. As such projector server 210 provides the RPAC users with an entry point through which the RPAC users interact with the data video projector 140 and all of the other components of the RPAC method and apparatus 100.

The projector interface 220 communicates with the hosted data/video projector 105 or a network enabled data/video projector 110. The host discovery interface 230 discovers other projector server hosts 105, network enabled projectors 110, and other compliant presentation collaboration devices (not shown) on the corporate intranet 130. The host interface 240 interacts with the identified projector server hosts 105, network enabled projectors 110, and other compliant presentation collaboration devices to obtain detailed information, which is then served to a client 115/120 or network server 125 using the facilities of the projector server 210 and the HTTP web server 217.

The projector interface 220 communicates with the existing prior art command line 250 or product host command interfaces 260 embedded in the data video projector 140 or network enabled data video projector 110 using whatever communication link is available and enabled by the particular model and make of the projector, such as a serial cable, universal serial bus (USB), or wireless/wired connection.

The host interface 240 uses the information provided by the host discovery interface 230 to enable clients 115/120 or a network server 125 to get or set information controlling the projectors 110 and 140 through the identified active projector server hosts 105 or the network enabled projector 110 itself, including administering the security, operation, and maintenance of the projectors 110 and 140. The projector server 105 serves web content obtained from the three interfaces to clients 115/120 or a network server 125 using a standard HTTP/web server 217 or other type of messaging protocol (e.g. Extended Markup Language (XML), or simple network message protocol (SNMP)) (not shown). Users of the clients 115/120 or a network server 125 are therefore able to browse to the active presentation projector resources 110 and 140 using the information served over the corporate intranet 130 to the client 115/120 by the HTTP/Web server 217.

The command line interface (CLI) 250 is known in the art, and allows for raw ASCII strings to provide the mechanisms to retrieve projector setting and status information. The CLI 250 is embedded in many different models of presentation projectors that are widely used in corporate enterprise settings. The product host command interface (PCHI) 260 is a proprietary command language developed to extend the feature set of presentation projector control and administration, and is also embedded in the data video projectors 140 or network enabled projectors 110. Examples of CLI and PCHI embedded presentation projectors are sold under the trademark LIGHTPORT by In Focus Systems, Inc., of Wilsonville, Oreg., the assignee of the present application. The projector interface 220 is responsible for interacting with the CLI 250 and PCHI 260 to read and write certain well-defined values physically located in the projector hardware.

The RPAC projector server 210 and host 240, host discovery 230 and projector interfaces 220 perform together to maintain in the repository 215 various customized user profiles for users of the data video projectors 110 and 140. Also maintained are the presentation files (e.g. the Microsoft PowerPoint presentations, or Word documents, or Adobe Acrobat portable data format (pdf) files) and related security information (i.e. passwords) for files that may be selected by clients 115/120 for storage and presentation on the projector server hosts 105 and data video projectors 110 and 140.

The repository 215 may also contain identification information identifying other projector server hosts 105 and network enabled projectors 110 discovered on the network by the host discovery interface 230. The identifying information may include the host name, location, contact person, power schedule, security passwords and the like, as obtained by the host interface 240. The repository 215 may further contain diagnostic information relating to presentation file transfer and projector management and administration as captured by the host interface 240.

Figure 3:
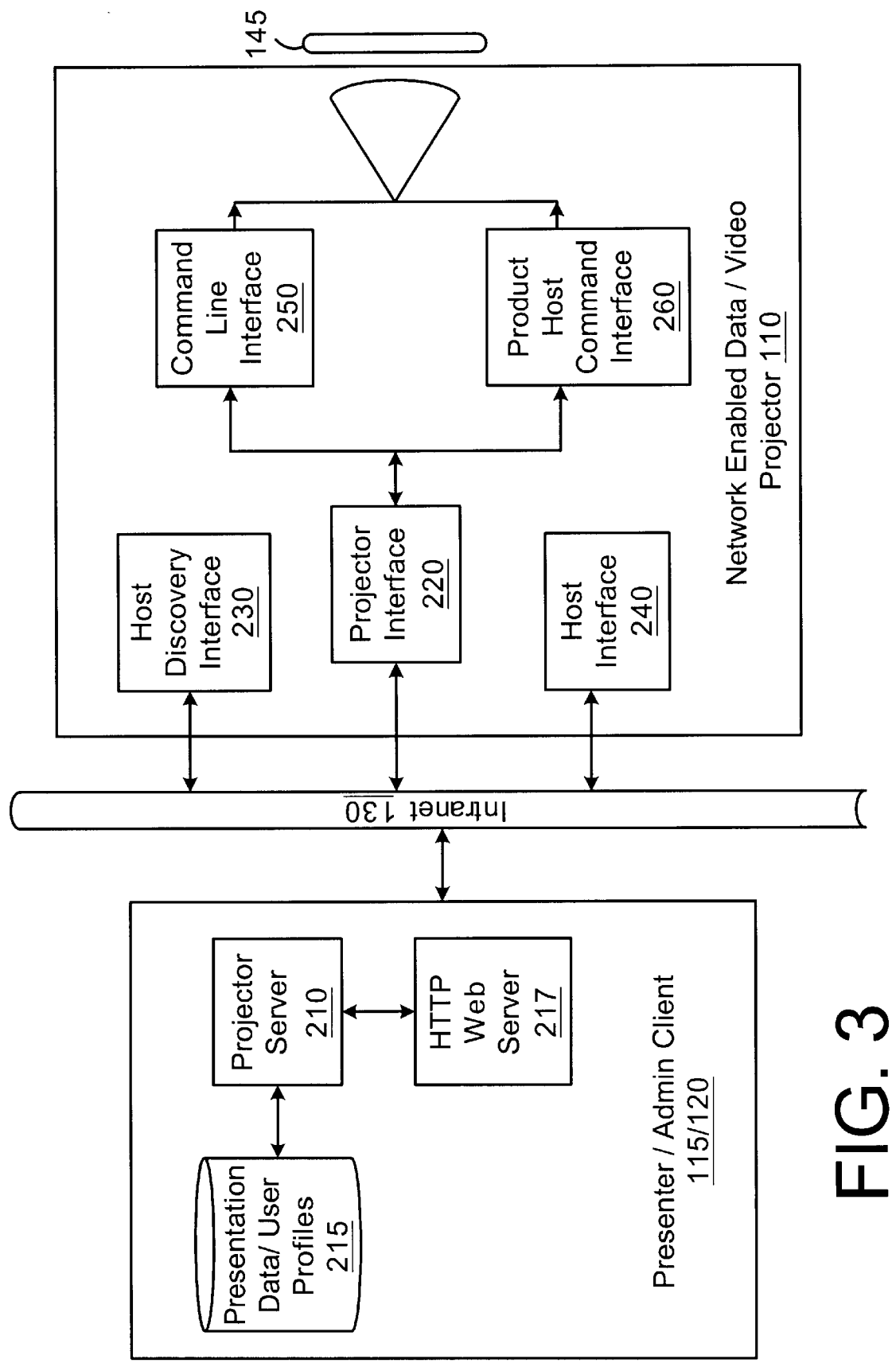
FIG. 3 illustrates a block diagram of the functional components of the present invention in accordance with another embodiment.

Referring now to FIG. 3, wherein a block diagram illustrating one embodiment of the functional components of the RPAC method and apparatus 100 as implemented in a network enabled data video projector 110. As shown, the projector server 210, repository 215, and HTTP web server 217 components may reside in the client 115/120 used by the presenter or administrator. The projector server 210, in communication over a corporate intranet 130 interacts with the host discovery interface 230, host interface 240 and projector interface 220 in the manner previously described. A similar embodiment of the RPAC method and apparatus 100 may be implemented as a personal application that enables a mobile user, such as a salesperson using a laptop computer or PDA to temporarily connect directly to a projector server host 105 or network enabled projector 110 in order to deliver a presentation stored on the laptop or PDA in accordance with a user profile for the projector, both of which are uploaded to the projectors 110 or 140 using the facilities of the RPAC method and apparatus 100. Similarly, a customer support representative may use the personal application implementation of the RPAC 100 to diagnose a problem with the projector using the facilities of the projector server 210 in conjunction with the projector interface 220, CLI 250, and/or the PCHI 260.

Referring now to FIGS. 1–3 together, it should be apparent that some or all of the above-described functions of the RPAC method and apparatus 100 may be performed by one or more of the various projector servers 210 and associated host interface 240, host discover interface 230, and projector interface 220, in conjunction with a variety of configurations of projector server hosts 105, clients 115/120, network servers 125 and projectors 110 and 140. In particular, some of the functional components 210, 220, 230, and 240 may reside in part on the RPAC clients 115/120 and/or network servers 125, which communicate over a intranet 130 as shown, or over the Internet 140, or over a local area or wide area network or combination of networks, or any other network configuration capable of connecting them. The physical database(s) comprising the repository 215 may reside on one or more of the various projector server hosts 105 or network server 125, and portions of the database(s) may be replicated on one or more of the various other RPAC components including the clients 115/120 and the projectors 110/140, and periodically synchronized as needed with the data residing on the servers.

Figure 4:
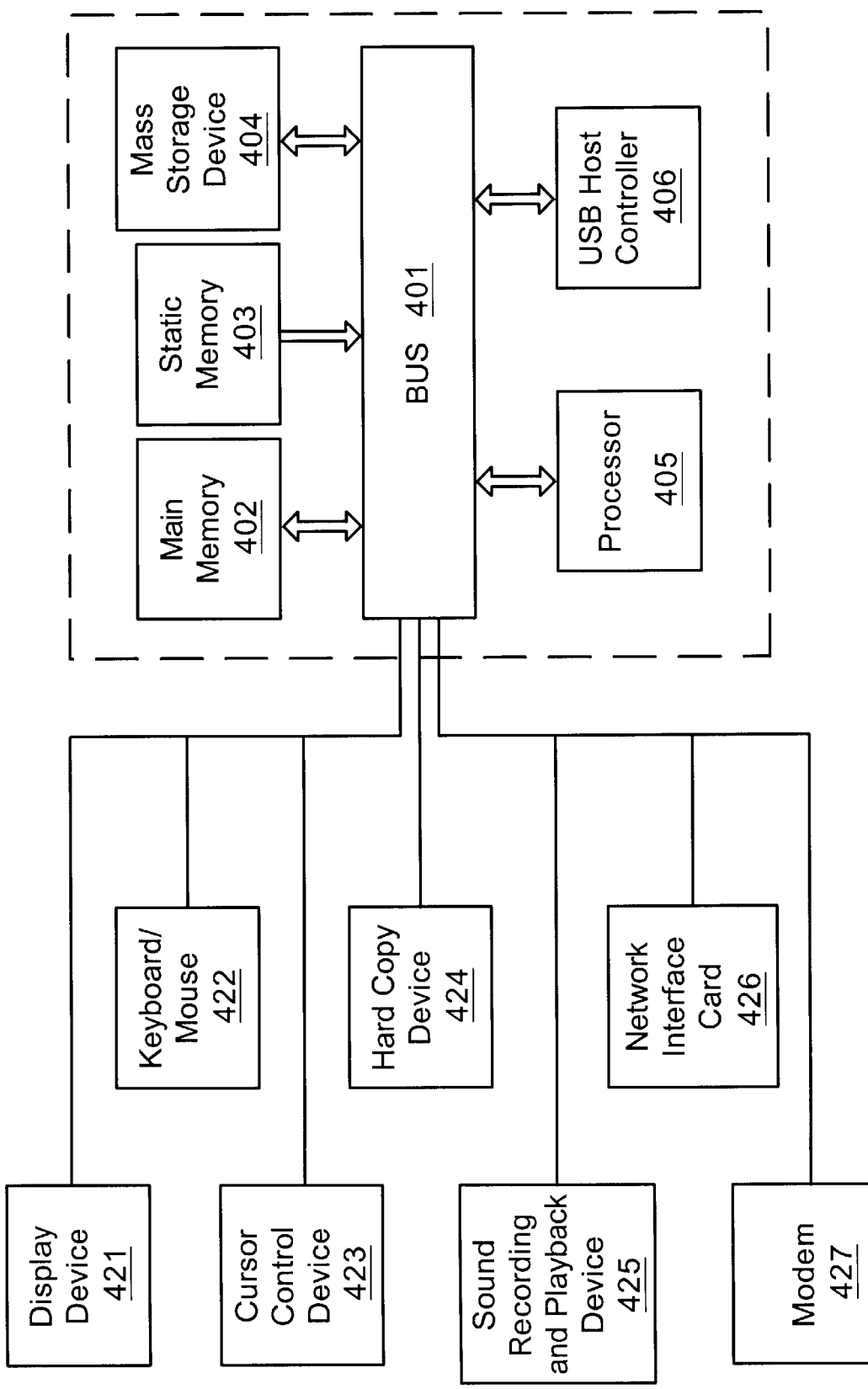
FIG. 4 illustrates a general-purpose computer system upon which an embodiment of the present invention may be implemented.

Referring now to FIG. 4, wherein a block diagram of a general-purpose computer system upon which an embodiment of the present invention may be implemented is shown. As illustrated, general-purpose computer system 400 comprises a bus 401, or other communications hardware and software, for communicating information, and a processor 402 coupled with bus 401 for processing information. Computer system 400 further comprises a random access memory (RAM) or other dynamic storage device 402 (referred to as main memory), coupled to bus 401 for storing information and instructions to be executed by processor 402. Computer system 400 also comprises a read only memory (ROM) 403, and/or other static storage device, coupled to bus 401 for storing static information and instructions for processor 402. Mass storage device 404 is coupled to bus 401 for storing information and instructions. In one embodiment, mass storage device 404 includes the repository 215 of presentation files and user profiles used to control and administrate the presentation projector resources 110 and 140 by various RPAC clients 115/120.

Furthermore, mass storage device 404, such as a magnetic disk or optical disk, and its corresponding disk drive, can be coupled to computer system 400. Computer system 400 can also be coupled via bus 401 to a display device 421 for displaying information to a computer user such as a network manager. Display device 421 is used to display windows containing a graphical user interface to the available electronic assets managed by the electronic asset lending library. Display device 421 can include a frame buffer, specialized graphics rendering devices, a cathode ray tube (CRT), and/or flat pane display. An alphanumeric input device 422, including alphanumeric and other keys, is typically coupled to bus 401 for communicating information and command selections to processor 405. Another type of user input device is cursor control device 423, such as a mouse, a trackball, a pen, a touch screen, or cursor direction keys for communicating direction information and command selections to processor 405, and for controlling cursor movement on display device 421. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 401 is a hard copy device 424 which may be used for printing instructions, data, or other information on a medium such as paper, film, or similar types of media. Additionally, computer system 400 can be coupled to a device for sound recording, and/or playback 425, such as an audio digitizer coupled to a microphone for recording information. Further, the device may include a speaker that is coupled to a digital to analog (D/A) converter for playing back the digitized sounds.

Network interface card 426 is coupled to bus 401. Network interface card 426 is further coupled to an external computer network (not shown). Network interface card 426, in conjunction with appropriate data communications protocols (e.g., the TCP/IP suite of internetworking protocols), provide the means by which a electronic asset lending library operating on a general-purpose computer system 400 exchanges information with other devices coupled to the same computer network. Modem 427 is coupled to bus 401, and provides an alternate means of exchanging information with other devices for which a modem connection to an external computer network or device (not shown) can be established.

Computer system 400 and RPAC application software stored and executed therein as part of the RPAC method and apparatus operate in conjunction with an operating system with graphics capability, such as Microsoft's Windows operating system. Commercially available computer systems implementing the features of general-purpose computer system 400 include a broad range of operating system-based computers, including server computers, desktop computers, workstations, personal digital assistants, devices, or appliances. Furthermore, the present invention may be used in conjunction with various browser (e.g. Microsoft Internet Explorer or Netscape Navigator) and electronic mail applications (e.g. Microsoft Outlook, and Lotus Notes) or other messaging applications to yield an operational platform upon which an embodiment of the RPAC method and apparatus 100 may be implemented.

Figure 5A:
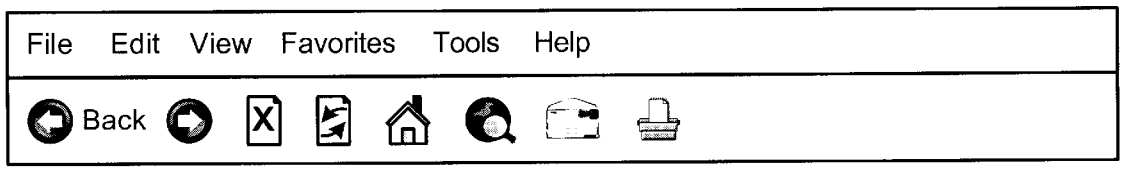
FIG. 5a illustrates an example of a display of an Administration web page, in accordance with one embodiment.
Figure 5A:
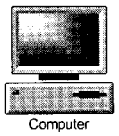

Referring now to FIGS. 5a–5j, wherein one embodiment of the projector administration and control web pages generated by the HTTP/Web server 217 in response to the projector server 105 operating in conjunction with the host interface 240, the host discover interface 230 and the projector interface 220. Using a menu-based or other navigational aid, the RPAC user/administrator desiring to perform administrative tasks for a projector in the corporate enterprise's projector resources, navigates through the RPAC user interface to cause the display of an Administration page 510, as illustrated in FIG. 5a. The RPAC user/administrator can be a corporate employee other individual responsible for managing the projector resources for the corporate enterprise.

Figure 5B:
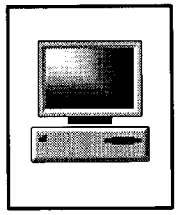
FIG. 5b illustrates an example of a display of an System Setup web page, in accordance with one embodiment.
Figure 5C:
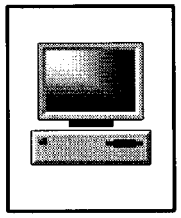
FIG. 5c illustrates an example of a display of an Usage Notes web page, in accordance with one embodiment.
Figure 5D:
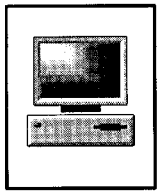
FIG. 5d illustrates an example of a display of an Delete Presentation web page, in accordance with one embodiment.
Figure 5E:
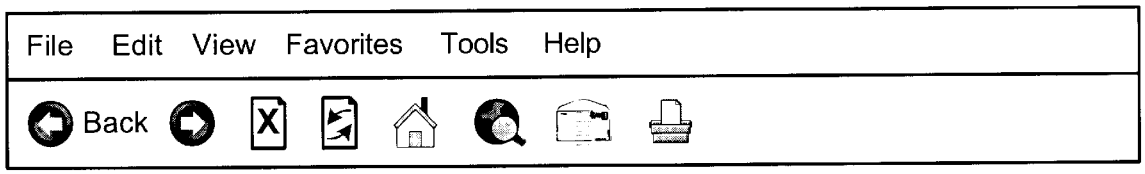
FIG. 5e illustrates an example of a display of an Projector Setup web page, in accordance with one embodiment.
Figure 5E:
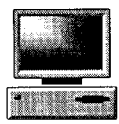
Figure 5F:
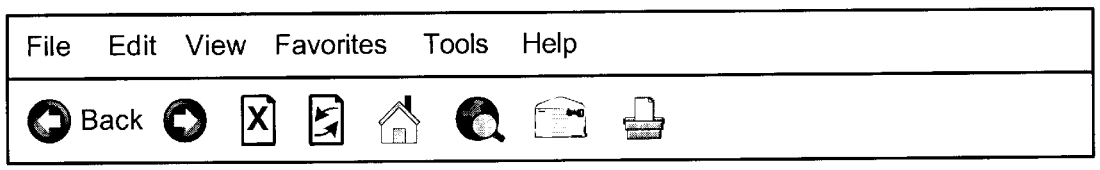
FIG. 5f illustrates an example of a display of an Projector Power Management web page, in accordance with one embodiment.
Figure 5F:
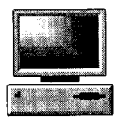
Figure 5G:
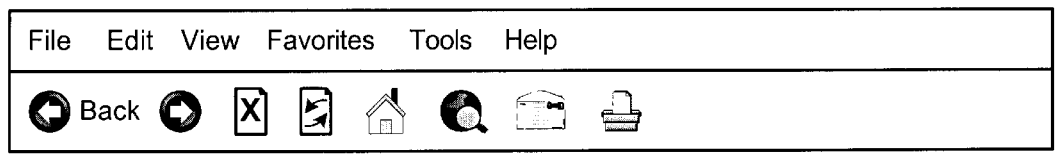
FIG. 5g illustrates an example of a display of a Settings/Video Standard web page, in accordance with one embodiment.
Figure 5H:
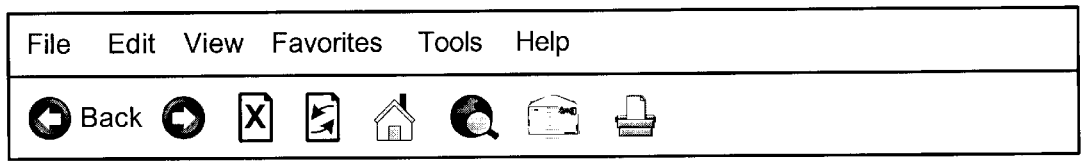
FIG. 5h illustrates an example of a display of a Settings/Projector Location web page, in accordance with one embodiment.
Figure 5J:
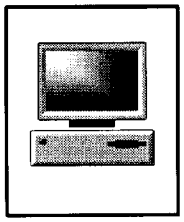
FIG. 5j illustrates an example of a display of an Edit Administration Password web page, in accordance with one embodiment.

The Administration page 510 contains, among other items, at least five possible selections including a system setup selection 511 for entering projector host 105 information as shown in the System Setup page 516, and as illustrated in FIG. 5b; a projector setup selection 512 for entering projector specific information for the data video projector 140 itself as shown in the Projector Setup page 532, and as illustrated in FIG. 5e; the system status selection 513 for viewing the diagnostic and log information obtained through the projector interface 220 as shown in the System Status page 551, and as illustrated in FIG. 5i; the edit admin password selection 514 for editing the password for accessing the data video projector 140 as shown in the Edit Administration Password page 552, and as illustrated in FIG. 5j; and the logout selection 515.

With reference to FIG. 5b, input areas on the System Setup page 516 are provided to enter the system name of the projector 517, the contact person 518, the location 519 (e.g. name of conference room) and to designate whether the projector server 105 is a supernode 520. Additional selections include Usage Notes 521, Presentation Security 522, and Delete Presentation 523. A command button or other graphical visual icon is provided for affirmatively entering a command 524 ("Submit") to update the entries to the input areas. With reference to FIG. 5c, an input area 526 is provided to enter a free-form text message that is associated with the projector. With reference to FIG. 5d, a list of presentation files 529 on a Delete Presentation page 528 is provided to enable the identification and deletion of presentation files on the projector server host 105.

With reference to FIG. 5e, a Projector Power Management web page 535 is provided with a display of the current scheduling for powering off the projector, and input areas 536 to select and edit the date and time. Further provided is an indicator 537 whether the projector enables power off settings. With reference to FIGS. 5g–5h, two Settings pages 539 and 545 are provided to view and alter the various video standard and projector location. For example, The projector room location for Conference Room A may be indicated as Ceiling Mount On 541 to insure that the projector display is oriented 180 degrees from the normal desktop orientation, to insure the proper orientation of the image.

With reference to FIG. 5i, a System Status page 551 is provided to display all of the diagnostic and log information that has been captured by the host interface 240. The captured information is retrieved through the services of a projector server in communication with a projector interface and projector host interface. As is illustrated, an example of the type of captured information is "The projector has been on for 0 hours 10 minutes." Lastly, with reference to FIG. 5j, an Edit Administration Password page 552 is provided to allow a client to add or change the password for the selected projector.

It should be understood that the web pages illustrated in FIGS. 5a–j as shown is for descriptive purposes only, and that other variations for accomplishing the described entry, selections or commands to the features of the RPAC method and apparatus may be employed without departing from the principles of or exceeding the scope of the present invention.

Example Implementation

The present invention may be implemented using a variety of programming languages or programming techniques. One example of an implementation of the projector server 210 and the interfaces to the projector server, the host interface 240, the host discover interface 230, and the projector interface 220, is using Component Object Model (COM) objects. COM is a model for object-oriented programming. The COM specifies how objects interact and communicate witin a single application, a distributed application or between applications (e.g. client/server applications) by defining a set of standard interface. Object interfaces are groupings of semantically related functions through which a client application accesses the services of a server application.

In the COM implementation of the present invention consists of COM objects to represent the projector server 210, the projector interface 220, the host discover interface 230, and the host interface 240. A selection of the various object interfaces for these COM objects are listed below in Table 1.

TABLE 1

| Interface | Method | Usage |
|---|---|---|
| IHost-Discover | AddRemoteHost Method | Add a host to the remote table. The discovery algorithm is not capable of discovering hosts that are not on the local router. Use this method to indicate non-router hosts that need to be discovered |
| | RemoveRemoteHost Method | Remove a host from the remote table. This method is used to remove hosts added via the AddRemoteHost method. |
| | EnumerateRemoteHosts Method | Returns an array of BSTR's containing the entries in the remote host table. Each BSTR contains either a domain or IP style address for a remote host added through the AddRemoteHost method. |
| | EnumerateDiscoverHosts Method | |
| | RemoteGetHostInfo Method | |
| IHost | GetHostInfo Method | Retrieve information about the Projector Host PC. |
| | SetHostInfo Method | Change the alias name, location or contact info of the Projector Host PC. |
| | GetSecurityInfo Method | Retrieve information abut the global security settings assigned by the administrator for this Projector Host PC. |
| | SetSecurityInfo Method | Sets information about the global security settings assigned by the administrator for this Projector Host PC. |
| | GetPowerInfo Method | Retrieve information of whether the Projector hardware installed on the Projector Host PC will be automatically powered on and or off at certain times. |
| | SetPowerInfo Method | Set information regarding whether the Projector hardware installed on the Projector Host PC will be automatically powered on and or off at certain times. |
| | GetLogInfo Method | Retrieves a string that contains a collection of information logged by the Host Projector Server software and the Projector hardware COM object attached to the Projector Host PC. |

TABLE 1-continued

| Interface | Method | Usage |
|---|---|---|
| | ResetLog Method | Clears the log for the Host Projector Server. |
| | GetHostNotes Method | Returns the host notes for this node. |
| | SetHostNotes Method | Sets the host notes for this node. |
| | ShutdownServer Method | Gracefully shutdown the Host Projector Server software. |
| | GetStatusInfo | Retrieves an array of strings that contain information logged by the Ihost interface. |
| | ResetStatusInfo | Resets the information logged by the StatusLog* functions. |
| | StatusLogFilePlay | Logs an attempt to play a file. |
| | StatusLogFileRejected | Log an attempt to transfer a file to the system that was rejected due to lack of file system space. |
| | StatusLogFileRemove StatusLogFileTransfer | Log the removal of a file. |
| IProjector | EnumerateProjectorProperties Method | Retrieves a list of all the properties supported by the projector hardware. The property list is passed as a SAFEARRAY of BSTRs where each BSTR contains the data that describes an individual projector property. Think of the BSTR as holding a row of data elements delimited by ',' characters as follows: name, type, access. |
| | GetProjectorProperty Method | |
| | SetProjectorProperty Method | |
| | GetProjectorInfo Method | Retrieves information about the Projector hardware installed on the Projector Host PC. Note that the values have been set by calls to SetProjectorInfo and as such are subject to user errors. |
| | SetProjectorInfo Method | Sets information about the Projector hardware installed on the Projector Host PC. Note that setting all strings to empty or null strings is equivalent to unconfiguring the IProjector interface. |
| | QueryPower Method | This function returns the power capability of the projector. Because it is impossible to communicate with a projector that is off, the bOn variable could also indicate and ELINKDOWN condition due to an improperly configured COM port or a disconnected serial cable. |
| | SetPower Method | This method is used to power on or off the projector. |
| | SetCommunicationPort Method | This method is used to set the communication port used to communicate with the projector. Clients of this method should use the TestCommunications method to verify the new port is valid. |
| | GetCommunicationPort Method | This method id sued to get the communication port used to communicate with the projector. |
| | SetTimeout Method | This method is used to set the communication timeout with the projector. Setting the timeout to zero resets the timeout to the default value. |
| | GetTimeout Method | This method is used to get the communication timeout with the projector. |
| | TestCommunications Method | Used to test a serial communication port with the projector. |

TABLE 1-continued

| Interface | Method | Usage |
|---|---|---|
| | ResetrojectorSettings Method | This method should reset all projector settings to a "default" state. This state can be defined per projector or globally, depending on the requirements as defined by InFocus. |
| | GetStatusInfo Method | Retrieves an array of strings that contain a collection of information logged by the projector. Note that there is no way to reset these values since they are logged internally in the projector. |
| | AutoConfigure | This member function attempts to configure the Iprojector interface by communicating directly with the projector. This function will not attempt to adjust properties of the PC display, however. If this function fails, then the projector should be configured using the SetProjectorInfo Method. |

Accordingly, a novel method and apparatus is described for a remote projector administration and control method and apparatus, so as to enable the remote administration and control of presentation projector resources installed in a networked enterprise environment. From the foregoing description, those skilled in the art will recognize that many other variations of the present invention are possible. In particular, while the present invention has been described as being implemented in RPAC projector server 210, and interfaces 220, 230, and 240, some of the logic may be distributed in other components of a general-purpose computer system 400. Thus, the present invention is not limited by the details described. Instead, the present invention can be practiced with modifications and alterations within the spirit and scope of the appended claims.

What is claimed is:

1. A remote projector control apparatus comprising:
   a first projector connected to a first host projector computer;
   a projector interface on the first host projector computer to control the first projector through an interface;
   a host discovery interface to discover at least one of a plurality of second projectors connected to at least one of a plurality of second host projector computers;
   a client computer responsive to a host interface, the client computer remotely connected to the first host projector computer; and
   a projector server on the first host projector computer to serve a client host interface with a plurality of projector information obtained from the projector interface and the host discovery interface about the first projector and the at least one of the plurality of second projectors, and to serve the client host interface with a plurality of host information about the first host projector computer and the at least one of a plurality of second host projector computers.

2. The apparatus of claim 1, wherein the first projector is further responsive to a product/host command interface, and wherein the projector interface further controls the projector through the product/host command interface.

3. The apparatus of claim 1, wherein serving the client host interface includes enabling the client to obtain or set administrative information including a host name, a location, a contact person, a schedule to control power to the projector, and security data.

4. The apparatus of claim 3, wherein serving the client host interface further includes enabling the client to transfer a presentation file for storage on the host projector computers, the presentation file containing display information for the projector to project on a presentation surface.

5. The apparatus of claim 1, wherein serving the client host interface includes formatting a web page browsable by the client via an HTTP/web server on the projector server.

6. The apparatus of claim 4, wherein the client host interface further captures diagnostic information about the transferred presentation file and the obtained or set administrative information by logging the diagnostic information for storage on the host projector computer.

7. A method of remotely controlling a projector in a networked enterprise, comprising:
   preparing a presentation file on a client;
   creating a user profile on the client;
   transmitting from the client to a projector server host the presentation file and the projector user profile in response to a user request;
   uploading from the projector server host to the projector, the transmitted presentation file and projector user profile in response to the user request; and
   initiating a presentation display using the projector in response to the user request and according to the uploaded presentation file and projector user profile;
   wherein the client browses to the projector through an HTTP/web server responsive to a projector server, the projector server serving content obtained from a projector interface, the projector interface controlling the at least one of a plurality of projectors in the networked enterprise.

8. The method of claim 7 wherein the projector interface controls the at least one of a plurality of projectors through a command line interface embedded in the projector.

9. The method of claim 7 wherein the projector interface controls the at least one of a plurality of projectors through a product host command interface embedded in the projector.

10. The method of claim 7 wherein the user request to transmit, upload and initiate a presentation display is initiated through the HTTP/web server responsive to the projector server and projector interface.

11. The method of claim 7 wherein the transmitting is performed using a wireless connection from a client host interface to the projector server.

12. The method of claim 7 wherein the uploading is performed using a wireless connection for the projector server to the projector.

13. The method of claim 7 wherein the HTTP/web server serves to a client host interface a plurality of web documents containing presentation information and projector information.

14. The method of claim 13 wherein the plurality of web documents containing presentation information include a presentation file name, a presentation file owner, a presentation received time and a presentation security password.

15. The method of claim 13 wherein the plurality of web documents containing projector information include an identification of the plurality of projectors including a projector system name, a projector location, an administrative contact, a projector type, a projector resolution, and an administration password.

16. The method of claim 15 wherein the projector information further includes a projector input source, a projector video standard, a projector room location, and a projector image type.

17. The method of claim 16 wherein the projector input source is network, computer or video.

18. The method of claim 16 wherein the projector video standard is auto, NTSC, PAL, or NTSC 4.3.

19. The method of claim 16 wherein the projector room location is ceiling mount or rear projection.

20. The method of claim 16 wherein the projector image type includes auto image, auto resize and hot point.

21. The method of claim 14, wherein access to the presentation information is controlled by the presentation security password.

22. The method of claim 15 wherein access to the projector information is controlled by the administration password.

23. A method for remote administration of a projector in a networked enterprise, comprising:

discovering by a host discover interface, at least one of a plurality of projectors connected to a projector host computer connected to a network;

obtaining by a host interface responsive to a request by a client administrator, projector information about the discovered projector's host computer information including a host computer name, a location, a contact person, a current power schedule, a host notes, a log information, and a host computer security setting;

serving by a projector server, the projector information for the at least one of a plurality of projectors formatted into HTML web pages for display to the client administrator;

updating by the projector server, projector information displayed in the web pages responsive to a selection entered by the client administrator; and communicating to the at least one of a plurality of projectors, the updated projector information.

24. The method of claim 23 wherein the host discover interface is a COM component that resides on the projector server and wherein the projectors are discovered using a broadcast request transmitted over the network.

25. The method of claim 23 wherein the host interface is a COM component interface that resides on each of a plurality of client computers used for remote administration of the plurality of networked projectors and the request to the host interface is one of a plurality of commands supported by the COM component interface to obtain projector host computer information including the host projector name, the location, the contact person, the current power schedule, the host notes, the log information, and the host computer security setting.

26. The method of claim 23 wherein the serving of the projector information is responsive to a request to a projector interface residing on the projector.

27. The method of claim 26 wherein the projector interface is a COM component interface and the request to the projector interface is one of a plurality of commands supported by the COM component interface to obtain projector-specific information including model number, resolution, supported video formats, power status, communication port, default communication timeout value, communication status, and projector log.

28. An apparatus for remotely controlling a projector in a networked enterprise, comprising:

means for preparing a presentation file on a client;

means for creating a user profile on the client;

means for transmitting from the client to a projector server host the presentation file and the projector user profile in response to a user request;

means for uploading from the projector server host to the projector, the transmitted presentation file and projector user profile in response to the user request; and means for initiating a presentation display using the projector in response to the user request and according to the uploaded presentation file and projector user profile;

wherein the client browses to the projector through an HTTP/web server responsive to a projector server, the projector server serving content obtained from a projector interface, the projector interface controlling the at least one of a plurality of projectors in the networked enterprise.

29. The apparatus of claim 28 wherein the projector interface controls the at least one of a plurality of projectors through a command line interface embedded in the projector.

30. The apparatus of claim 28 wherein the projector interface controls the at least one of a plurality of projectors through a product host command interface embedded in the projector.

31. The apparatus of claim 28 wherein the user request to transmit, upload and initiate is presentation display is initiated through the HTTP/web server responsive to the projector server and projector interface.

32. The apparatus of claim 28 wherein the HTTP/web server serves to a client host interface a plurality of web documents containing presentation information and projector information.

33. The apparatus of claim 32 wherein the plurality of web documents containing presentation information include a presentation file name, a presentation file owner, a presentation received time and a presentation security password.

34. The apparatus of claim 32 wherein the plurality of web documents containing projector information include an identification of the plurality of projectors including a projector system name, a projector location, an administrative contact, a projector type, a projector resolution, and an administration password.

* * * * *